(12) United States Patent  
Marie-Luce et al.

(10) Patent No.: US 9,416,706 B2
(45) Date of Patent: Aug. 16, 2016

(54) EXHAUST GAS TREATMENT SYSTEM COMPRISING A CATALYTIC PARTICULATE FILTER, AND CORRESPONDING METHOD

(71) Applicant: RENAULT s.a.s., Boulogne-Billancourt (FR)

(72) Inventors: David Marie-Luce, Paris (FR); Damiano Di-Penta, Paris (FR)

(*) Notice: Subject to any disclaimer, the term of this patent is extended or adjusted under 35 U.S.C. 154(b) by 53 days.

(21) Appl. No.: 14/409,047

(22) PCT Filed: Jun. 7, 2013

(86) PCT No.: PCT/FR2013/051318
§ 371 (c)(1),
(2) Date: Jan. 30, 2015

(87) PCT Pub. No.: WO2013/190210
PCT Pub. Date: Dec. 27, 2013

(65) Prior Publication Data
US 2015/0192045 A1 Jul. 9, 2015

(30) Foreign Application Priority Data

Jun. 19, 2012 (FR) ...................................... 12 55743

(51) Int. Cl.
*B01D 53/94* (2006.01)
*F01N 3/035* (2006.01)
(Continued)

(52) U.S. Cl.
CPC .............. *F01N 3/035* (2013.01); *F01N 3/0293* (2013.01); *F01N 3/033* (2013.01); *F01N 3/208* (2013.01);
(Continued)

(58) Field of Classification Search
CPC ........ F01N 3/208; F01N 3/2066; F01N 3/206; F01N 3/035; B01D 53/9418
See application file for complete search history.

(56) References Cited

U.S. PATENT DOCUMENTS

2007/0144152 A1 6/2007 Lueders
2007/0277507 A1 12/2007 Yan
(Continued)

FOREIGN PATENT DOCUMENTS

CA 2865929 A1 * 9/2013 ............. B01D 53/90
FR 2 895 445 A1 6/2007

OTHER PUBLICATIONS

International Search Report issued Jul. 29, 2013, in PCT/FR13/051318 filed Jun. 7, 2013.
(Continued)

*Primary Examiner* — Timothy Vanoy
(74) *Attorney, Agent, or Firm* — Oblon, McClelland, Maier & Neustadt, L.L.P.

(57) ABSTRACT

The invention relates to an exhaust gas treatment system comprising a catalytic particulate filter, a catalytic reduction device for the reduction of nitrogen oxides, which is mounted downstream of the catalytic particulate filter, an injection device mounted upstream of the catalytic particulate filter, a means for determining the temperature of the catalytic particulate filter and an electronic control unit able to command injection of reducing agent. The electronic control unit comprises a first control means able to command injection of the reducing agent in order to obtain a reference quantity of reducing agent stored in the filter that corresponds to a filter temperature below a threshold, and a second control means able to command the injection of reducing agent in order to obtain a reference quantity of reducing agent stored in the device that corresponds to a filter temperature higher than said threshold.

10 Claims, 2 Drawing Sheets

Figure 1:
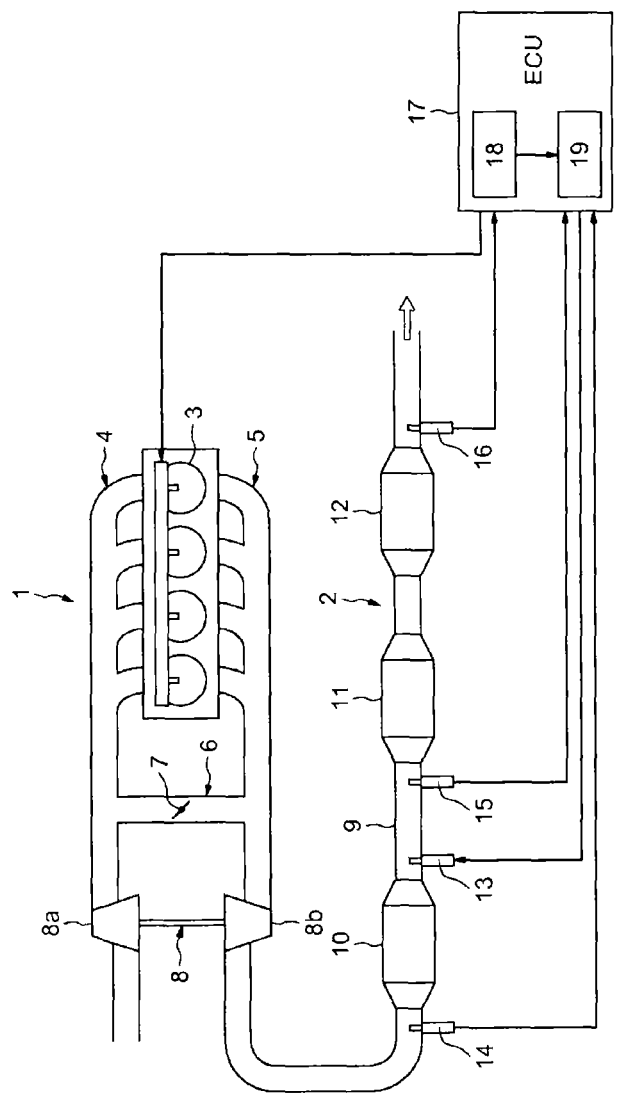

(51) Int. Cl.
*F01N 3/20* (2006.01)
*F01N 9/00* (2006.01)
*F01N 3/033* (2006.01)
*F01N 3/029* (2006.01)

(52) U.S. Cl.
CPC ............ *F01N 9/002* (2013.01); *F01N 2250/02* (2013.01); *F01N 2560/026* (2013.01); *F01N 2560/06* (2013.01); *F01N 2570/14* (2013.01); *F01N 2570/18* (2013.01); *F01N 2610/02* (2013.01); *F01N 2900/1602* (2013.01); *Y02T 10/24* (2013.01); *Y02T 10/47* (2013.01)

(56) References Cited

U.S. PATENT DOCUMENTS

2015/0020506 A1* 1/2015 Johansen ............... B01D 53/90
60/274
2015/0204226 A1* 7/2015 Moore .................... F01N 3/208
60/274

OTHER PUBLICATIONS

French Preliminary Search Report issued Mar. 25, 2013, in French Application No. 12 55743 filed Jun. 19, 2012.

* cited by examiner

EXHAUST GAS TREATMENT SYSTEM COMPRISING A CATALYTIC PARTICULATE FILTER, AND CORRESPONDING METHOD

The present invention relates to a system and a method for treating exhaust gases, using in particular a catalytic particulate filter that can treat nitrogen oxides (NOx), in particular NO and $NO_2$. More precisely, the invention relates to a system and a method for treating nitrogen oxides during the thermal regeneration phases of the catalytic particulate filter.

To meet the decreasing acceptable thresholds for emissions of pollutant gases, more and more complex treatment systems for gases are placed in the exhaust line of lean-burn engines, in particular diesel engines. These post-treatment systems can in particular reduce emissions of particulates and nitrogen oxides as well as carbon monoxide and unburned hydrocarbons.

The selective catalytic reduction (SCR) method is a known treatment method for nitrogen oxides NOx. The method consists in a continuous treatment of nitrogen oxide emissions using a catalyst placed in the exhaust line of the engine and a reducing agent injected into the exhaust line. The reducing agent is generally ammonia, which can be injected in its molecular form or as urea. If the latter, urea is stored in a reservoir, in the vehicle, and is injected and mixed with the exhaust gases before entering the catalyst. The catalyst can accelerate the reduction reaction of nitrogen oxides by the reducing agent.

Moreover, to limit the quantity of particulates in the exhaust gases expelled into the atmosphere, it is also known to use a particulate filter. The particulate filter can be mounted in series with the selective reduction catalyst for nitrogen oxides, or can be combined with the selective reduction catalyst for nitrogen oxides. If the latter, this is called a catalytic particulate filter, which can catalyze the reduction of nitrogen oxides and filter soot particulates contained in the exhaust gases, which leads to cost and volume reductions in the system.

To ensure that filtered soots are eliminated by the catalytic particulate filter and to prevent head losses in the exhaust line of the combustion engine, it is necessary to thermally regenerate the catalytic particulate filter. The thermal regeneration of the catalytic particulate filter is done by increasing the catalytic particulate filter's temperature until the soot combusts. For a diesel vehicle, such a regeneration occurs after on average about one hundred kilometers.

However, even though the efficacy of the catalytic material contained in the catalytic particulate filter is increased by increasing temperature, in spite of this, the regeneration leads to substantial release, in the gases exiting the catalytic particulate filter, of the reducing agent used to reduce the nitrogen oxides. This reducing agent, generally ammonia, is particularly odoriferous and toxic.

Patent application FR 2895445 describes such a system in which a catalytic particulate filter is mounted on the exhaust line of a combustion engine. A reducing agent injector is mounted upstream of said filter, and the system comprises a control means that can decrease, or interrupt, the injections of reducing agent in the exhaust line before and during thermal regenerations of the catalytic particulate filter, to prevent any ammonia leaks. However, stopping the injection of reducing agent during the regeneration phases reduces the efficacy of the treatment of the nitrogen oxides, so they are therefore found in higher quantities in the exhaust gases expelled into the atmosphere.

The present invention aims to solve the technical problems set out previously. In particular, the aim of the invention is to propose a system that can limit reducing agent leaks, while also producing better global efficacy for soot and nitrogen oxide treatment.

According to one feature, a system is proposed for treating the exhaust gases emitted by an internal combustion engine, comprising a catalytic particulate filter that can catalyze the reduction of nitrogen oxides, mounted in the exhaust line of the engine, an injection device for a reducing agent in the exhaust line, mounted upstream of the catalytic particulate filter, and an electronic control unit that can order the injection of the reducing agent into the exhaust line.

The system also comprises a catalytic reduction device for nitrogen oxides, mounted downstream of the catalytic particulate filter. The reduction catalyst for nitrogen oxides can have reduced volume and is only used to recover the excess reducing agent from the catalytic particulate filter, during the thermal regenerations of the latter. Accordingly, the quantity of reducing agent released in the exhaust gases and the quantity of nitrogen oxides are reduced, which means the system's global efficacy is improved.

The system also comprises a means of determining the temperature of the catalytic particulate filter and the electronic control unit comprises a first control means that can order the injection of the reducing agent into the exhaust line to obtain a specified quantity of reducing agent stored in the catalytic particulate filter corresponding to a temperature of the catalytic particulate filter less than a threshold, and a second control means that can order the injection of the reducing agent into the exhaust line to give a specified quantity of reducing agent stored in the catalytic reduction device for nitrogen oxides corresponding to a temperature of the catalytic particulate filter greater than said threshold.

Accordingly, the first and the second control means can, as a function of the temperature of the catalytic particulate filter, order the injection of the reducing agent into the exhaust line so as to regulate and optimize the quantity of reducing agent stored in the catalytic particulate filter (case where the catalytic particulate filter presents a temperature lower than the thermal regeneration temperature, and can therefore catalyze the selective reduction of nitrogen oxides), or to regulate and optimize the quantity of reducing agent stored in the device for selective catalytic reduction of nitrogen oxides (case where the catalytic particulate filter presents a temperature greater than the thermal regeneration temperature, and therefore releases reducing agents in the exhaust gases). Accordingly, the selective catalytic reduction device for nitrogen oxides is used advantageously by adapting the reducing agent injection order as a function of the temperature ranges of the catalytic particulate filter. Accordingly, the system can regulate the quantities of reducing agent stored in the catalytic particulate filter and in the selective catalytic reduction device for nitrogen oxides. The quantities of reducing agent injected and stored in the different catalysts are adapted as a function of the temperature (i.e. as a function of the mode of operation of the catalytic particulate filter) so as to prevent any leaks of reducing agent, while preserving the efficacy of the NOx treatment by the system.

Preferably, the first control means comprises a means of determining the specified quantity of reducing agent stored in the catalytic particulate filter as a function of the temperature of the catalytic particulate filter, the flow rate of the exhaust gases and the flow rate of the nitrogen oxides, and the second control means comprises a means of determining the specified quantity of reducing agent stored in the catalytic reduction device for nitrogen oxides, as a function of the temperature of the catalytic particulate filter, the flow rate of the exhaust gases and the flow rate of the nitrogen oxides.

The specified quantity of reducing agent stored in the catalytic particulate filter or in the selective catalytic reduction device for nitrogen oxides is determined as a function of the operating conditions of the catalytic particulate filter or of the selective catalytic reduction device for nitrogen oxides. Accordingly, according to the operating conditions, these specified quantities of stored reducing agent may vary, and therefore change the reducing agent injection order in the exhaust line. These quantities are in particular determined so as to give the catalytic particulate filter or the selective catalytic reduction device for nitrogen oxides increased treatment efficacy for nitrogen oxides, under the given operating conditions.

Preferably, the electronic control unit comprises a means of estimating the effective quantity of reducing agent stored in the catalytic particulate filter and the effective quantity of reducing agent stored in the catalytic reduction device for the nitrogen oxides. What is more, the first control means comprises a means of correcting the reducing agent injection order as a function of the difference between the specified quantity and the effective quantity of reducing agent stored in the catalytic particulate filter, and the second control means comprises a means of correcting the reducing agent injection order as a function of the difference between the specified quantity and the effective quantity of reducing agent stored in the catalytic reduction device for nitrogen oxides. As well as the specified quantities of reducing agent stored, the electronic control unit also determines the quantities of reducing agent effectively stored in the two devices for treating the nitrogen oxides (catalytic particulate filter and selective catalytic reduction device for nitrogen oxides) so as to determine the quantity of reducing agent to inject into the exhaust line.

The system may also comprise an oxidation catalyst device mounted in the exhaust line, upstream of the means of injecting the reducing agent.

The system may further comprise a sensor mounted downstream of the selective catalytic reduction device and that can measure the global flow rate of nitrogen oxides and reducing agent exiting the selective catalytic reduction device.

The invention also relates, according to another feature, to a treatment method for exhaust gases emitted by an internal combustion engine equipped, in its exhaust line, with a catalytic particulate filter that can catalyze the reduction of nitrogen oxides and a catalytic reduction device for nitrogen oxides mounted downstream of the catalytic particulate filter, comprising:
- a first step of determining the temperature of the catalytic particulate filter,
- a second step of trapping the particulates contained in the exhaust gases and selective catalytic reduction of the nitrogen oxides contained in the exhaust gases, when the temperature of the catalytic particulate filter is less than a threshold and
- a third step of combusting the particulates trapped in the catalytic particulate filter, and then of selective catalytic reduction of the nitrogen oxides contained in the exhaust gases, when the temperature of the catalytic particulate filter is greater than said threshold.

The method also comprises the injection of a reducing agent into the exhaust line including:
- a first step of controlling an injection to give a specified quantity of reducing agent stored in the catalytic particulate filter, during the second step, and
- a second step of ordering an injection to give a specified quantity of reducing agent stored in the catalytic reduction device for nitrogen oxides, during the third step.

Preferably, the first step of injection comprises a step of determining the specified quantity of reducing agent stored in the catalytic particulate filter as a function of the catalytic particulate filter temperature, the flow rate of the exhaust gases and the flow rate of the nitrogen oxides.

Preferably, the first step of injection comprises a step of estimating the effective quantity of reducing agent stored in the catalytic particulate filter and a step for correcting the injection order as a function of the difference between the specified quantity and the effective quantity of reducing agent stored in the catalytic particulate filter.

Preferably, the second step of injection comprises a step of determining the specified quantity of reducing agent stored in the catalytic reduction device for nitrogen oxides, as a function of the catalytic particulate filter temperature, the flow rate of the exhaust gases and the flow rate of the nitrogen oxides.

Preferably, the second step of injection comprises a step of estimating the effective quantity of reducing agent stored in the catalytic reduction device for nitrogen oxides, and a step for correcting the reducing agent injection order as a function of the difference between the specified quantity and the effective quantity of reducing agent stored in the catalytic reduction device for nitrogen oxides.

Figure 2:
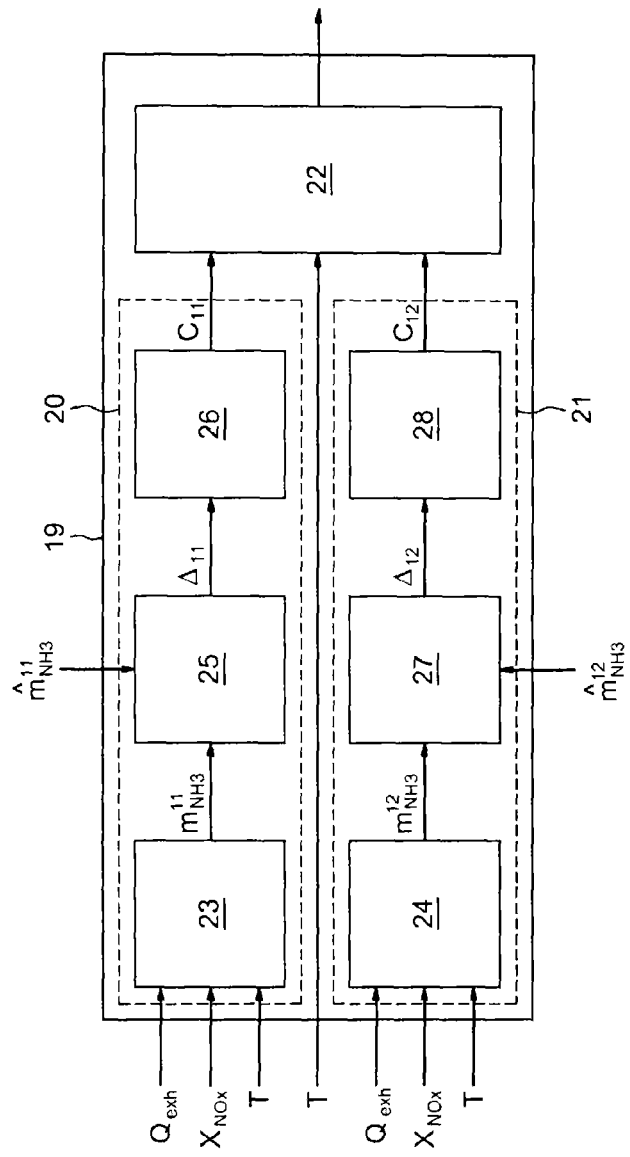

Other benefits and characteristics of the invention will appear upon examination of the detailed description of an embodiment of the invention, taken as a non-limiting example, and of the attached drawings, on which:

FIG. 1 schematically represents a post-treatment system for exhaust gases according to the invention; and FIG. 2 represents a synoptic diagram illustrating the architecture of a portion of a control unit.

FIG. 1 shows, in a very schematic manner, the general structure of an internal combustion engine 1 and a post-treatment system for the exhaust gases 2. The internal combustion engine 1 comprises, for example, at least one cylinder 3, an intake manifold 4, an exhaust manifold 5, an exhaust gas recirculation circuit 6 equipped with a recirculation valve for exhaust gases 7, and a turbo-compression system 8 including a compressor 8a and a turbine 8b.

The post-treatment system for the exhaust gases 2 comprises an exhaust line 9 on which are mounted, in the sense of exhaust gas flow in line 9, an oxidation catalyst 10, a catalytic particulate filter 11 and a selective catalytic reduction (SCR) device for nitrogen oxides 12. Moreover, an injector 13 for a reducing agent, for example for urea, is mounted downstream of the oxidation catalyst 10 and upstream of the catalytic particulate filter 11. The exhaust line 9 may also comprise a means of mixing (not shown) mounted between the injector 13 and the catalytic particulate filter 11, and that homogenizes the mixture constituted of the exhaust gases and the reducing agent. It should be noted that the oxidation catalyst 10 could be omitted without changing the invention.

The system 2 also comprises a first temperature sensor 14 mounted upstream of the oxidation catalyst 10 and that can sense the temperature of the gases supplying the oxidation catalyst 10 (and therefore the temperature of the oxidation catalyst 10) during the different exhaust gas treatment phases. The system 2 also comprises a second temperature sensor 15 mounted upstream of the catalytic particulate filter 11 and that can sense the temperature of the gases supplying the catalytic particulate filter 11 (and therefore the temperature of the catalytic particulate filter 11) during the different exhaust gas treatment phases. The system 2 may also comprise a NOx sensor 16, mounted downstream of the selective catalytic reduction device for the nitrogen oxides 12. The sensor 16 can in particular measure the flow rate of nitrogen oxides exiting the exhaust line 9 during operation.

An electronic control unit ECU 17 processes the various signals and the combustion order, in particular by sending the specified values to the fuel injector in cylinder 3 and by controlling the quantity of air supplying the cylinders 3 and the flow rate of the exhaust gases recycled by action on the valve 7.

The electronic control unit 17 may also order the reducing agent injector 13 to introduce the desired quantity of reducing agent into the exhaust line 9.

The electronic control unit 17 comprises a means 18 of estimating the effective quantity of reducing agent, for example ammonia, $\hat{m}_{NH_3}^{11}$ stored in the catalytic particulate filter 11 and of the effective quantity of reducing agent (ammonia) $\hat{m}_{NH_3}^{12}$ stored in the selective catalytic reduction device for nitrogen oxides 12. The means 18 in particular estimates the quantities $\hat{m}_{NH_3}^{11}$ and $\hat{m}_{NH_3}^{12}$ as a function of the values provided by the sensor 16, which measures the flow rate of the nitrogen oxides as they exit the selective catalytic reduction device 12, and as a function of the quantity of reducing agent introduced into the exhaust line 9 by the injector 13.

The values $\hat{m}_{NH_3}^{11}$ and $\hat{m}_{NH_3}^{12}$ are then sent to a means of development 19 of the reducing agent injector order 13 in the exhaust line 9.

Accordingly, as shown in FIG. 2, the means of development 19 receives as inputs: the values $\hat{m}_{NH_3}^{11}$ and $\hat{m}_{NH_3}^{12}$ determined and sent by the means of estimation 18, the temperature value of the gases measured by the second sensor 15, the nitrogen oxides level $X_{NOx}$ in the exhaust gases and the flow rate values of the exhaust gases $Q_{exh}$ circulating in the exhaust line 9. The means of development 19 comprises a first control means 20, a second control means 21 and a means of selection 22 (see FIG. 2).

The first control means 20 comprises a means of determination 23 of a specified quantity of reducing agent stored in the catalytic particulate filter 11. The means of determination 23 receives as input the gas temperature values T measured by the second sensor 15, the nitrogen oxides level $X_{NOx}$ in the exhaust gases and the exhaust gases flow rate values $Q_{exh}$, and determines, from a mapping or an algorithm, a specified quantity $fn_{NH_3}^{11}$ of reducing agent stored in the catalytic particulate filter 11 that can give high nitrogen oxide treatment efficacy, low reducing agent consumption and low ammonia leak at the catalytic particulate filter 11 outlet. Accordingly, the specified quantity $fn_{NH_3}^{11}$ is established by optimizing the previously cited parameters.

The specified quantity $fn_{NH_3}^{11}$ is then sent to a means of comparison 25 that also receives the value $\hat{m}_{NH_3}^{11}$ determined by the means of estimation 18. The means of comparison 25 calculates the difference between the two values: $\Delta_{11}=\hat{m}_{NH_3}^{11}-fn_{NH_3}^{11}$ and sends it to a means of correction 26 that can correct the reducing agent injection order as a function of the difference $\Delta_{11}$. The means of correction 26 thereby determines an injection order Cn that can give the specified quantity of reducing agent stored in the catalytic particulate filter 11, as a function of the effective quantity of reducing agent already stored in said filter 11. In particular, if the quantity $\hat{m}_{NH_3}^{11}$ is less than $fn_{NH_3}^{11}$, the order Cn increases the injection of reducing agent into the exhaust line. If the quantity in $\hat{m}_{NH_3}^{11}$ is greater than $fn_{NH_3}^{11}$, the order Cn does not trigger injection of reducing agent into the exhaust line. The injection order Cn is sent to the means of selection 22.

The second control means 21 comprises a means of determination 24 of a specified quantity of reducing agent stored in the selective catalytic reduction device 12. The means of determination 24 receives as input the gas temperature values T measured by the second sensor 15, the nitrogen oxides level $X_{NOx}$ in the exhaust gases and the exhaust gases flow rate values $Q_{exh}$, and determines, from a mapping or an algorithm, the specified quantity $m_{NH_3}^{12}$ of reducing agent stored in the selective catalytic reduction device 12 for nitrogen oxides that can give high nitrogen oxide treatment efficacy, low reducing agent consumption and low ammonia leak at the outlet of the selective catalytic reduction device 12 for nitrogen oxides. Accordingly, the specified quantity $m_{NH_3}^{12}$ is established by optimizing the previously cited parameters.

The specified quantity $m_{NH_3}^{12}$ is sent to a means of comparison 27 that also receives the value $m_{NH_3}^{12}$ determined by the means of estimation 18. The means of comparison 27 calculates the difference between the two values: $\Delta_{12}=\hat{m}_{NH_3}^{12}-fn_{NH_3}^{12}$, and sends it to a means of correction 28 that can correct the reducing agent injection order as a function of the difference $\Delta_{12}$. The means of correction 28 thereby determines an injection order $C_{12}$ that can give the specified quantity of reducing agent stored in the selective catalytic reduction device 12, as a function of the effective quantity of reducing agent already stored in said device 12. In particular, if the quantity $\hat{m}_{NH_3}^{12}$ is less than $fn_{NH_3}^{12}$, the order $C_{12}$ increases the injection of reducing agent into the exhaust line. If the quantity $\hat{m}_{NH_3}^{12}$ is greater than $fn_{NH_3}^{12}$, the order $C_{12}$ does not trigger injection of reducing agent into the exhaust line. The injection order $C_{12}$ is sent to the means of selection 22.

The means of selection 22 receives as input the injection orders Cn and $C_{12}$, and the temperature values T of the gases measured by the second sensor 15. When the temperature T is less than a threshold temperature, the means of selection 22 controls the injector 13 from the order $C_{11}$. When the temperature T is greater than a threshold temperature, the means of selection 22 controls the injector 13 from the order $C_{12}$.

Accordingly, as long as the temperature T of the catalytic particulate filter 11 has not reached the threshold temperature (corresponding to a thermal regeneration of the catalytic particulate filter 11), the quantity of reducing agent stored in the catalytic particulate filter 11 is regulated to make it operate as efficiently as possible. The nitrogen oxides are therefore treated mainly by the catalytic particulate filter 11. The selective catalytic reduction device 12 is not ordered to be active (for example has a temperature less than the activation temperature of the catalytic material). However, if it is active, it can then treat the residual nitrogen oxides or capture excess traces of reducing agent released by the catalytic particulate filter 11.

When the temperature T of the catalytic particulate filter 11 has reached the threshold temperature (corresponding to thermal regeneration of said catalytic particulate filter 11 or to a desorption temperature), reducing agent leaks occur at the catalytic particulate filter 11 outlet. Then the quantity of reducing agent stored in the selective catalytic reduction device 12 is regulated so as to make it operate as efficiently as possible, taking into account leaks of reducing agent from the catalytic particulate filter 11, and the quantity of reducing agent stored in the catalytic particulate filter 11 is no longer regulated. The nitrogen oxides are therefore treated mainly by the selective catalytic reduction device 12, and the leaks of reducing agent in the catalytic particulate filter 11 are captured by the selective catalytic reduction device 12.

Accordingly, thanks to the catalytic particulate filter, the selective catalytic reduction device present in the exhaust line 9, and the specific ordering of these two means as a function of the temperature of the catalytic particulate filter, it becomes possible to easily control and treat the nitrogen oxides that come from combustion engines and leaks of reducing agent coming from the treatment system.

The invention claimed is:

1. A treatment system for the exhaust gases emitted by an internal combustion engine, comprising:
    a catalytic particulate filter that can catalyze the reduction of nitrogen oxides, mounted in the exhaust line of the engine,
    a catalytic reduction device for nitrogen oxides, mounted downstream of the catalytic particulate filter,
    an injection device for a reducing agent in the exhaust line, mounted upstream of the catalytic particulate filter,
    a means of determining the temperature of the catalytic particulate filter and
    an electronic control unit that can order the injection of the reducing agent into the exhaust line,
    wherein the electronic control unit comprises a first control means that can order the injection of the reducing agent into the exhaust line to give a specified quantity of reducing agent stored in the catalytic particulate filter corresponding to a temperature of the catalytic particulate filter less than a threshold, and a second control means that can order the injection of the reducing agent into the exhaust line to give a specified quantity of reducing agent stored in the catalytic reduction device for nitrogen oxides corresponding to a temperature of the catalytic particulate filter greater than said threshold.

2. The treatment system as claimed in claim 1, in which the first control means comprises a means of determining the specified quantity of reducing agent stored in the catalytic particulate filter as a function of the temperature of the catalytic particulate filter, the flow rate of the exhaust gases and the flow rate of the nitrogen oxides, and in which the second control means comprises a means of determining the specified quantity of reducing agent stored in the catalytic reduction device for nitrogen oxides, as a function of the temperature of the catalytic particulate filter, the flow rate of the exhaust gases and the flow rate of the nitrogen oxides.

3. The treatment system as claimed in claim 2, in which the electronic control unit comprises a means of estimating the effective quantity of reducing agent stored in the catalytic particulate filter and of the effective quantity of reducing agent stored in the catalytic reduction device for nitrogen oxides, and in which the first control means comprises a means of correcting the reducing agent injection order as a function of the difference between the specified quantity and the effective quantity of reducing agent stored in the catalytic particulate filter, and in which the second control means comprises a means of correcting the reducing agent injection order as a function of the difference between the specified quantity and the effective quantity of reducing agent stored in the catalytic reduction device for nitrogen oxides.

4. The treatment system as claimed in claim 1, further comprising an oxidation catalyst device mounted in the exhaust line, upstream of the means of injecting reducing agent.

5. The treatment system as claimed in claim 1, further comprising a sensor mounted downstream of the selective catalytic reduction device and that can measure the global flow rate of nitrogen oxides and reducing agent exiting the selective catalytic reduction device.

6. A treatment method for exhaust gases emitted by an internal combustion engine equipped, in its exhaust line, with a catalytic particulate filter that can catalyze the reduction of nitrogen oxides and a catalytic reduction device for nitrogen oxides mounted downstream of the catalytic particulate filter, comprising:
    a first step of determining the temperature of the catalytic particulate filter,
    a second step of trapping the particulates contained in the exhaust gases and selective catalytic reduction of the nitrogen oxides contained in the exhaust gases, when the temperature of the catalytic particulate filter is less than a threshold and
    a third step of combusting the particulates trapped in the catalytic particulate filter, and then of selective catalytic reduction of the nitrogen oxides contained in the exhaust gases, when the temperature of the catalytic particulate filter is greater than said threshold,
    wherein the method also comprises injection of a reducing agent into the exhaust line including:
    a fourth step of ordering an injection to give a specified quantity of reducing agent stored in the catalytic particulate filter, during the second step, and
    a fifth step of ordering an injection to give a specified quantity of reducing agent stored in the catalytic reduction device for nitrogen oxides, during the third step.

7. The method as claimed in claim 6, in which the fourth step of injection comprises a step of determining the specified quantity of reducing agent stored in the catalytic particulate filter as a function of the catalytic particulate filter temperature, the flow rate of the exhaust gases and the flow rate of the nitrogen oxides.

8. The method as claimed in claim 6, in which the fifth step of injection comprises a step of determining the specified quantity of reducing agent stored in the catalytic reduction device for nitrogen oxides, as a function of the catalytic particulate filter temperature, the flow rate of the exhaust gases and the flow rate of the nitrogen oxides.

9. The method as claimed in claim 7, in which the fourth step of injection comprises a step of estimating the effective quantity of reducing agent stored in the catalytic particulate filter and another step for correcting the injection order as a function of the difference between the specified quantity and the effective quantity of reducing agent stored in the catalytic particulate filter.

10. The method as claimed in claim 8, in which the fifth step of injection comprises a step of estimating the effective quantity of reducing agent stored in the catalytic reduction device for nitrogen oxides, and another step for correcting the reducing agent injection order as a function of the difference between the specified quantity and the effective quantity of reducing agent stored in the catalytic reduction device for nitrogen oxides.

* * * * *